C. B. EDWARDS.
NAIL AND WASHER FOR SHEET METAL ROOFING AND THE LIKE.
APPLICATION FILED MAR. 13, 1915.

1,144,700. Patented June 29, 1915.

WITNESSES

INVENTOR
Christopher B. Edwards,
by John Elias Jones,
ATTORNEY.

UNITED STATES PATENT OFFICE.

CHRISTOPHER B. EDWARDS, OF COVINGTON, KENTUCKY.

NAIL AND WASHER FOR SHEET-METAL ROOFING AND THE LIKE.

1,144,700.  Specification of Letters Patent.  Patented June 29, 1915.

Application filed March 13, 1915. Serial No. 14,264.

*To all whom it may concern:*

Be it known that I, CHRISTOPHER B. EDWARDS, a citizen of the United States of America, and a resident of Covington, in the county of Kenton and State of Kentucky, have invented a certain new and useful Improvement in Nails and Washers for Sheet-Metal Roofing and the like, of which the following is a specification.

This invention relates to the peculiar sharp-pointed nails and soft or pliable washers used in attaching sheet-metal roofing-plates on the top covering or sheathing of a building-structure, and its object is to provide a combination of nail and washer that are put together so that they can be handled in their connected state for convenience in applying them for use and the resultant material economy in the expenditure of time and labor to accomplish the work.

Figure 1:
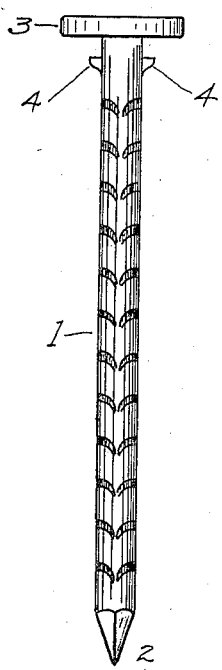
Figure 2:
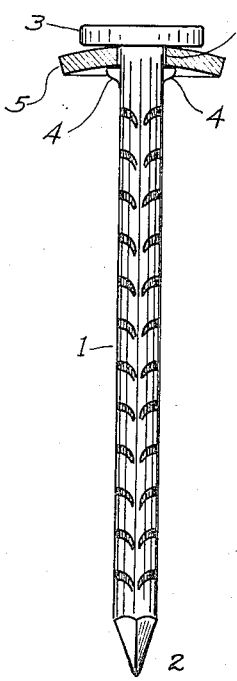
Figure 3:
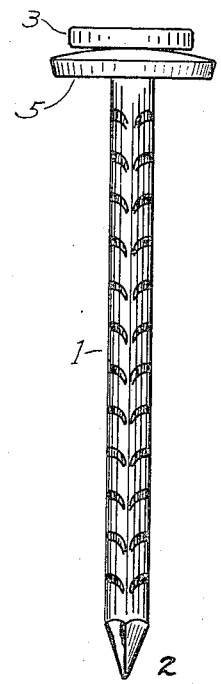
Figure 4:
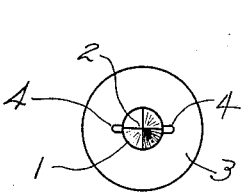
Figure 5:
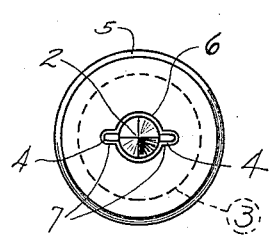

In the accompanying sheet of drawings, Figure 1 is an elevation of the nail-structure without the attendant-washer; Fig. 2, a similar view of the nail but having its attendant-washer that is shown in cross-section and in connected-place as used thereon; Fig. 3, an elevation of the assembled parts of the invention as they appear complete and ready for use; Fig. 4, a bottom plan or lower end view of Fig. 1; Fig. 5, a bottom plan of the device showing the washer in its initial position on the nail-shank ready for turning one-fourth of a revolution into close or snug connecting-position ready for handling and for use; and Fig. 6, a view similar to Fig. 5, but showing the washer in full connected-position on the nail-shank ready for use.

1 indicates the roughened or barbed shank of the nail that is tapered to a point at its lower end 2 and has a broad flat head 3, as customary with roofing-nails.

Figure 6:
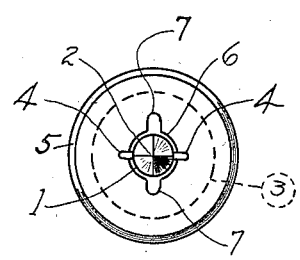

A pair of laterally-extending lugs 4, 4 is provided on the shank 1 slightly below the head 3, just about the depth or thickness of the washers used, and 5 indicates the customary soft or pliable concavo-convex washer having a central orifice 6, but the latter has lateral notches 7, 7, made therein to pass the lugs 4, 4, when the washer is placed on the shank 1 in contact with the head 3. The washer is, as customary, somewhat larger in diameter than the nail-head and is thereby readily turned quarter-way around, as shown in Fig. 6, and also, in the completed form seen in Fig. 2, so as to duly connect it in snug place under the nail-head and the shank 1 readily taken hold of when handling the nail preparatory to and in facilitating the setting of its point on the usually crimped sheet-metal for driving into fastening-place at joints in the roof.

The improvement produced in this device is a convenient one and does not add to the ultimate cost of the roof when the ready application of both the nail and washer is to be considered, especially when the washer is so conveniently held up away from the roof to allow a clear view of the driving position that the nail point is to take in the crimp or other part of the surface of the roof to be fastened. The lugs 4, 4, do not enter the roofing when the nail is driven into place, but become embedded in the soft washer to obviate making additional, extended indentations or holes in the crimp or joint.

I claim:—

In combination, a roofing-nail having a suitable head and a pair of radially-projecting pins or lugs on the shank duly spaced below said head, and a washer having a central orifice that is radially-notched to enable the free passage of the washer over said lugs to snug position beneath said head and to be turned part-way for passing said lugs and adapting them to hold the washer on the shank directly beneath said head for manipulation in application for use.

CHRISTOPHER B. EDWARDS.

Witnesses:
JOHN ELIAS JONES,
BERL RIGDON.